United States Patent [19]
Goudal et al.

[11] Patent Number: 6,010,361
[45] Date of Patent: Jan. 4, 2000

[54] ELECTRICAL UNIT FOR PLUGGING INTO A MOUNT, IN PARTICULAR A SELF-CONTAINED EMERGENCY LIGHTING UNIT

[75] Inventors: Jean-Paul Goudal, Limoges; Nicolas Pourieux, Couzeix, both of France

[73] Assignees: Legrand; Legrand SNC, both of Limoges, France

[21] Appl. No.: 08/904,606

[22] Filed: Aug. 1, 1997

[30] Foreign Application Priority Data

Aug. 2, 1996 [FR] France .................................. 96 09829

[51] Int. Cl.$^7$ .............................. H01R 13/73; H02B 1/01
[52] U.S. Cl. .......................................................... 439/553
[58] Field of Search ..................................... 439/553–555

[56] References Cited

U.S. PATENT DOCUMENTS

| | | | |
|---|---|---|---|
| 3,389,369 | 6/1968 | Curtis | 439/553 |
| 4,269,463 | 5/1981 | Beatenbough | 439/345 |
| 4,706,808 | 11/1987 | Guetersloh | 206/305 |
| 5,482,476 | 1/1996 | Watanabe | 439/555 |

FOREIGN PATENT DOCUMENTS 4428809  2/1996  Germany ......................... H02G 3/08

*Primary Examiner*—Paula Bradley
*Assistant Examiner*—Briggitte R. Hammond
*Attorney, Agent, or Firm*—Young & Thompson

[57] ABSTRACT

An electrical unit for plugging into a mount, in particular a self-contained emergency lighting unit, includes a hollow base the back of which plugs into a mount and has a back wall. It is removably closed at the front by at least one cover with, internally, at least one housing in which there is at least one active unit liable to be live. For fixing it to the hollow base, the cover is equipped with an elastically deformable lug which projects from its inside surface and the back wall of the hollow base has an opening for the elastically deformable lug of the cover to pass through and through which the latter is accessible from the rear of the hollow base, with at least one retaining lug on the hollow base for cooperating with it. Applications include self-contained emergency lighting units.

14 Claims, 2 Drawing Sheets

ELECTRICAL UNIT FOR PLUGGING INTO A MOUNT, IN PARTICULAR A SELF-CONTAINED EMERGENCY LIGHTING UNIT

BACKGROUND OF THE INVENTION

1. Field of the Invention

The present invention is generally concerned with electrical units which, for fixing them to a support of any kind, for example a wall, and for supplying them with power, plug into a mount attached to the support.

2. Description of the Prior Art

It is more particularly aimed at electrical units of this kind that include a hollow base the back of which is adapted to be plugged into the mount and has a back wall and which is removably closed at the front by at least one cover, with, internally, between the back wall and this cover, at least one housing in which there is at least one active member, for example a connecting terminal, that is liable to be live when the assembly is plugged into the mount.

This is the case, in particular, with certain self-contained emergency lighting units.

To alleviate the consequences of failure of the mains electrical power supply, these self-contained emergency lighting units include, internally, within their hollow base, a storage battery which is connected at all times to live connection terminals in order to keep it charged.

When it is necessary to obtain access to the storage battery, for example to remove it and/or to change it, among other feasible maintenance operations, there is the risk, for the operator, of unintentional contact with these connecting terminals, which is to the detriment of safety.

In some implementations the housing in which the storage battery is disposed is accessible from the front.

It is, in practice, a housing which extends over only part of the hollow base and which is closed by a particular cover to which is attached a cassette carrying the storage battery, whereas the other part of the hollow base, in which other units are housed, is closed by another cover, separate from the first, and removal of which is dependent on removal of the first cover.

Apart from the fact that, for the reasons given, this arrangement is not satisfactory from the safety point of view, it leads to the provision of two covers, which is to the detriment of the cost.

In other implementations, the housing in which the storage battery is disposed is accessible only from the rear of the hollow base and to obtain access to it the hollow base must first be demounted, which systematically isolates it, which is to the benefit of safety.

However, to hold the storage battery in its housing, the housing must be closed at the rear by a particular cap which is additional to the front cover or covers, and this is to the detriment of the cost.

A general object of the present invention is an arrangement satisfying safety requirements at the lowest cost.

SUMMARY OF THE INVENTION

To be more precise, the present invention consists in an electrical unit of the kind including a hollow base, the back of which is adapted to plug into a mount and has a base wall or back wall and which is removably closed at the front by at least one cover. Internally, between the back wall and the cover, there is at least one housing in which there is at least one active unit liable to be live. The cover is equipped with at least one globally hook-shaped elastically deformable lug which projects from its inside surface. The base wall or back wall of the hollow base has an opening for the elastically deformable lug of the cover to pass through, and which the elastically deformable lug is accessible from the rear of the hollow base. At least one retaining lug is positioned on the hollow base for cooperating with the elastically deformable lug of the cover.

Accordingly, to remove the cover to obtain access to the housing that it closes, it is necessary to operate from the rear of the hollow base and therefore to first dismount the hollow base from the mount, which systematically isolates it, which is in accordance with safety requirements.

The provision of releasable clipping means between the cover and the hollow base for holding the cover onto the hollow base is already known in itself.

However, unlike the elastically deformable lug in accordance with the invention, such releasable clipping means are accessible from the front of the hollow base and, what is more, to prevent unintentional gaping of the cover at its periphery, there is provision for disposing further such means, if required, between the cover and the hollow base of the electrical unit in accordance with the invention, in parallel with the elastically deformable lug that is characteristic of the, invention and in addition to it.

The hollow base of the electrical unit of the invention preferably includes at least one elastically deformable lug, also hook-shaped, and interfering with the path of movement of the elastically deformable lug of the cover when the latter is deflected from a locked position in which it is interengaged with the retaining lug of the hollow base to a released position in which it escapes from this retaining lug and is thus adapted to hold the elastically deformable lug in the released position.

When, after unplugging the hollow base, the elastically deformable lug of the cover is moved from its locked position to its released position, the elastically deformable lug or lugs of the hollow base temporarily hold(s) the elastically deformable lug of the cover in the released position, like a "memory" so to speak, allowing for this released position, with the advantage that the operator can turn over the assembly and operate on the cover from the front in order to remove it without at the same time having to hold its elastically deformable lug in the released position from behind.

The features and advantages of the invention will emerge from the following description given by way of example with reference to the accompanying diagrammatic drawings.

DETAILED DESCRIPTION OF THE PREFERRED EMBODIMENTS

Figure 1:
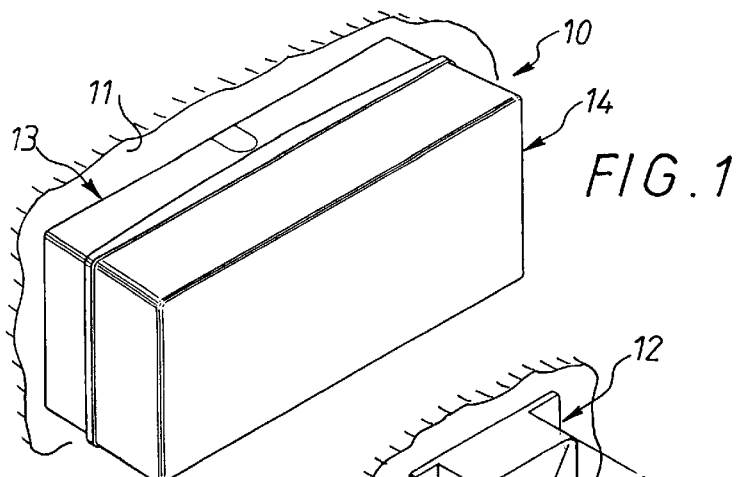
FIG. 1 is a perspective view of an electrical unit in accordance with the invention, in place on a support.
Figure 2:
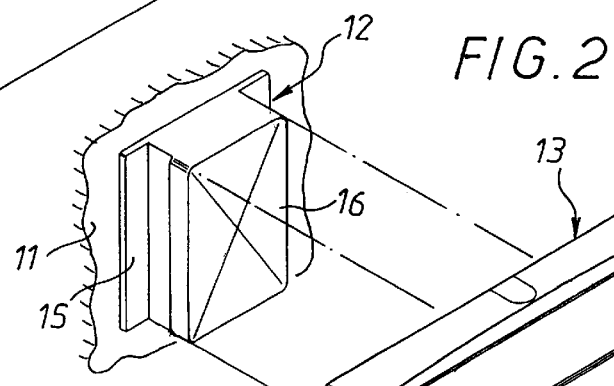
FIG. 2 is an exploded perspective view, derived from that of FIG. 1, showing the demounting of this electrical unit.

The figures show, by way of example, the application of the invention to the situation in which the electrical unit 10 concerned is a self-contained emergency lighting unit.

An electrical unit 10 of this kind being well known in itself, it will not be described in complete detail here.

Only its components necessary to an understanding of the invention will be described.

In the embodiment shown, the electrical unit 10 is generally parallelepipedal in shape and relatively long.

Designed to be attached to a support 11 of any kind, for example a wall, through the intermediary of a mount 12, it essentially comprises a hollow base 13 that carries one or more light sources, not shown, and contains associated components, also not shown, and a glass 14 covering the light source or sources.

The mount 12 is not in itself relevant to the present invention, and will therefore not be described in complete detail here.

Suffice to say that it includes a plate 15 by means of which it is adapted to be attached to the support 11 and, projecting from this plate 15, a block 16 into which the hollow base 13 of the electrical unit 10 plugs, to retain it mechanically and to power it electrically.

The back of the hollow base 13 of the electrical unit 10 is therefore adapted to be plugged into the mount 12; to this end, it has a base wall or back wall 18 delimiting a cavity 19 which, globally complementary to the block 16 of the mount 12, is open to the rear and by means of which it is plugged into the mount 12.

In the embodiment shown, the cavity 19 is in the middle part of the hollow base 13, substantially halfway between its ends.

The base wall or back wall 18 globally comprises five panels, namely a front panel 20 slightly set back from the opening of the hollow base 13, in line with the cavity 19 and forming the back of the latter, two rear panels 21, on respective opposite sides of the front panel 20, offset relative to the latter, and two merging panels 22 perpendicular to the front panel 20 and to the rear panels 21 and delimiting the cavity 19 laterally.

The hollow base 13 is removably closed at the front by at least one cover 23.

In the embodiment shown there is only one cover 23 which therefore covers all of the surface of the hollow base 13.

Also, in this embodiment, the cover 23 has an upstanding rim 24 set back from its edge and which is adapted to be plugged into the hollow base 13.

The hollow base 13 defines, internally, between its back wall 18 and the cover 23, at least one housing 25, in practice two such housings 25 on respective opposite sides of the front panel 20 of the back wall 18.

The front panel 20 of the back wall 18 being set back relative to the opening of the hollow base 13, the two housings 25 communicate with each other to the front of the front panel 20, above the latter.

There is at least one active unit 26 that is liable to be live in at least one of the housings 25.

Figure 3:
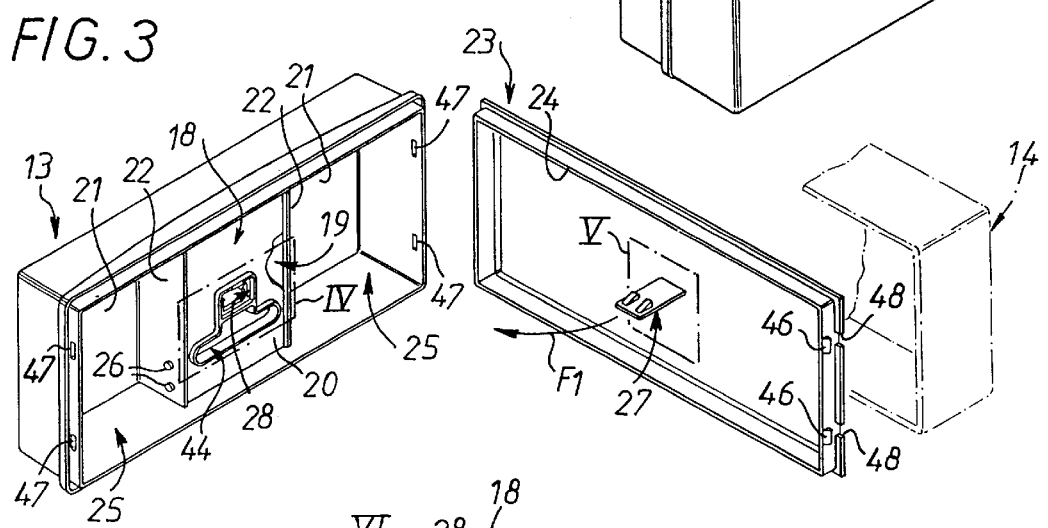
FIG. 3 is a locally cut away exploded perspective view showing the hollow base of the electrical unit in the open position and the cover associated with the hollow base.
Figure 4:
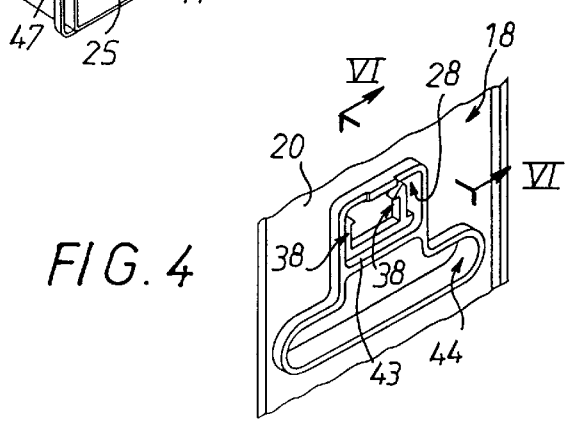
FIG. 4 shows the detail IV from FIG. 3, relating to the hollow base, to a larger scale.
Figure 5:
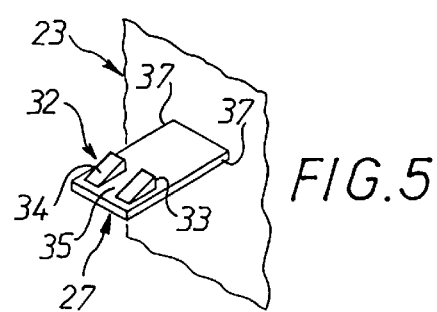
FIG. 5 shows the detail V of FIG. 3, relating to the cover, to the same scale as FIG. 4.

As shown diagrammatically in FIG. 3, for example, there are two active units 26 in one of the housings 25.

In the preferred embodiment the two active units 26 are connecting terminals of an electrical component such as a storage battery. The connecting terminals are in turn electrically connected to contact members (not shown) which are cooperable with complementary contact members (also not shown) which are provided on the blocks 16 of the mount 12. The complementary contact members on the mount are thus live at all times as they are connected to the electrical power supply whereas the active units 26 defining in this case the connecting terminals are only live when the electrical unit 10 is plugged into the mount 12.

For obvious safety reasons, it is important to ensure that access to the active unit 26 is prevented when they are live.

In accordance with the invention, the cover 23 is to this end equipped with at least one globally hook-shaped elastically deformable lug 27 for fixing it to the hollow base 13 and which projects from its inside surface; conjointly, the base wall or back wall 18 of the hollow base 13 has an opening 28 through which the elastically deformable lug 27 on the cover 23 can pass and through which the latter is therefore accessible from the rear of the hollow base 13, and only from the rear of the latter, with at least one retaining lug 30 on the hollow base 13 to cooperate with and retain the elastically deformable lug 27 of the cover 23 (FIGS. 6 through 9).

In the embodiment shown, the cover 23 has only one elastically deformable lug 27 in the middle, i.e. at a distance from its edge.

To be more precise, in the embodiment shown, the elastically deformable lug 27 is in the middle part of the cover 23, in line with the cavity 19 in the hollow base 13.

The opening 28 for it in the back wall 18 of the hollow base 13 is therefore in the middle part of the front panel 20 of the base wall or back wall 18.

In the embodiment shown, the elastically deformable lug 27 of the cover 23 is parallel to the longitudinal edges of the latter, but it could equally well be parallel to its transverse edges, or even oblique to these longitudinal and transverse edges.

The retaining lug 30 provided on the hollow base 13 flanks the opening 28 on the rear face of the front panel 20 of the back wall 18 and has an oblique insertion chamfer 31 at the front.

The elastically deformable lug 27 of the cover 23 carries a projecting retaining boss 32 for cooperating with the retaining lug 30, and also including a retaining lug 33 with an oblique insertion chamfer 34.

In the embodiment shown, the retaining boss 32 is divided in two by a gap 35 through which a tool can be passed and, in corresponding relationship to this, the retaining lug 30 of the hollow base 13 is itself divided in two by a gap 36.

For reasons that will emerge below, the retaining boss 32 of the elastically deformable lug 27 of the cover 23 is also set back relative to the lateral edges 37 of the elastically deformable lug 27.

Figure 7:
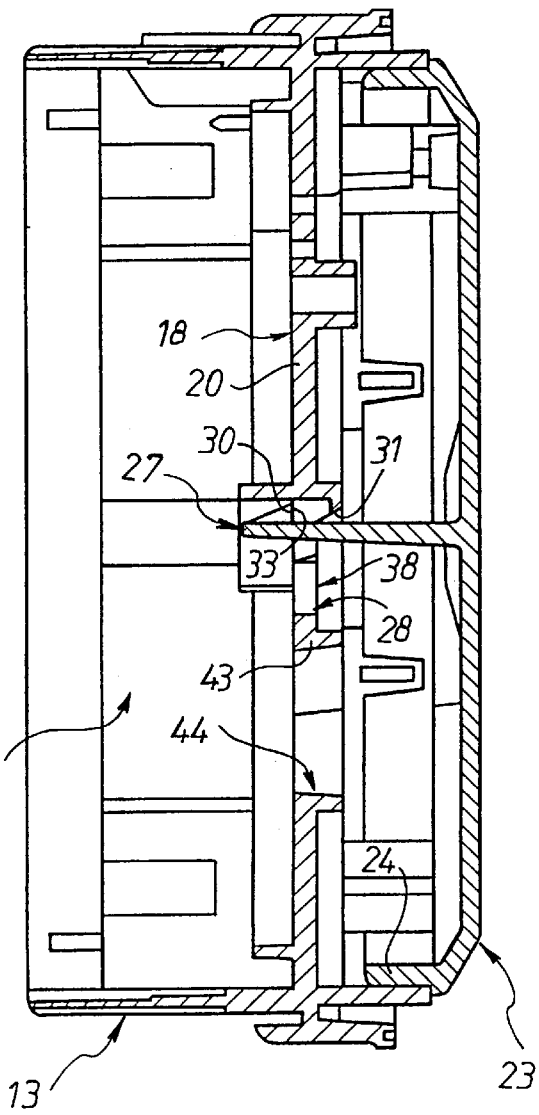
FIG. 7 is a cross-sectional view of the combination of the hollow base and the cover, taken along the same section line as that of FIG. 6, but to a smaller scale than the latter, in the locked position of the elastically deformable lug provided on the cover in accordance with the invention.

When, as shown diagrammatically by an arrow F1 in FIG. 3, the cover 23 is placed in the closed position on the hollow base 13, its elastically deformable lug 27 engages in the opening 28 in the back wall 18 of the hollow base 13 and, momentarily deflected by the oblique insertion chamfer 31, after passing the retaining lug 30 it resumes a locked position in which, as shown in FIG. 7, it is interengaged with the retaining lug 30 and therefore locks the cover 23 onto the hollow base 13.

The elastically deformable lug 27 being accessible only from the rear of the hollow base 13, it is necessary to unplug the latter from the mount 12 before the cover 23 can be removed.

Figure 8:
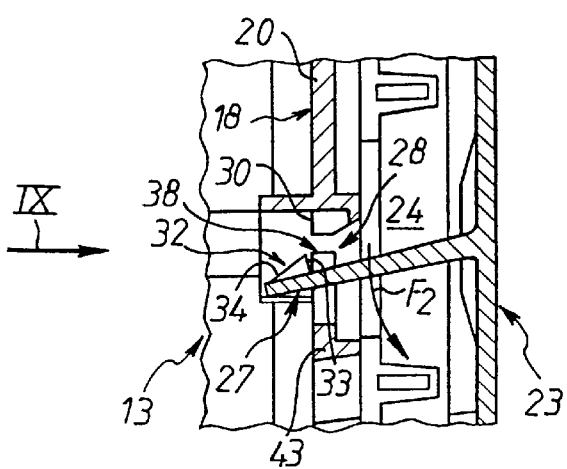
FIG. 8 is a fragmentary cross-sectional view repeating part of FIG. 7 for the released position of this elastically deformable lug.
Figure 9:
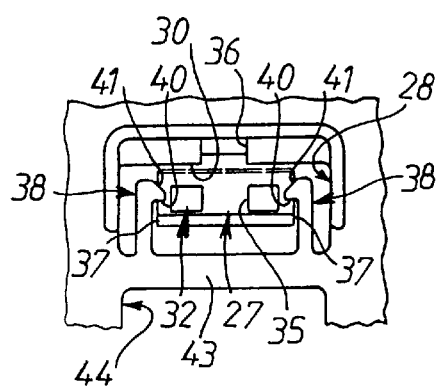
FIG. 9 is a fragmentary elevation view of the rear of the combination in the released position, as seen in the direction of the arrow IX in FIG. 8.

As in the embodiment shown, the hollow base 13 preferably includes, to facilitate removal of the cover 23, at least one elastically deformable lug 38 which is also hook-shaped with a retaining lug 40 with an oblique insertion chamfer 41 at the front and interferes with the path of movement of the elastically deformable lug 27 of the cover 23 when, as shown diagrammatically by an arrow F2 in FIG. 8, the latter is deflected from the locked position shown in FIG. 7, in which it is interengaged with the retaining lug 30 of the hollow base 13, to a released position shown in FIG. 8 in which it escapes from the retaining lug 30 and is thus adapted to hold the elastically deformable lug 27 in the released position.

In the embodiment shown, the elastically deformable lug 38 of the hollow base 13 extends laterally relative to the elastically deformable lug 27 of the cover 23 to cooperate with the corresponding lateral edge 37 of the latter and, in practise, the hollow base 13 has two facing elastically deformable lugs 38 for cooperating with respective lateral edges 37 of the elastically deformable lug 27 of the cover 23.

Because the retaining boss 32 of the elastically deformable lug 27 of the cover 23 is set back relative to the lateral edges 37 of the latter, the elastically deformable lugs 38 of the hollow base 13 cannot interfere unintentionally with the retaining boss 32.

In the embodiment shown, the elastically deformable lugs 38 of the hollow base 13 lie within the opening 28 in the base wall or back wall 18 of the latter.

To be more precise, in this embodiment, these elastically deformable lugs 38 project from a crosspiece 43 separating the opening 28 from a longer opening 44 on the front panel 20 of the back wall 18 for contact members which provide the electrical connection to the mount 12, these contact members being plug-in members, for example.

Be this as it may, when the elastically deformable lug 27 of the cover 23 is operated from the rear, the hollow base 13 having been unplugged from the mount 12, to move it into the released position in which it is interengaged with the elastically deformable lugs 38 of the hollow base 13, the hollow base 13 can be turned over and the cover 23 removed from the front, without any further action being necessary on the elastically deformable lug 27 of the cover 23.

With the cover 23 removed in this way, its elastically deformable lug 27 slides in contact with the retaining lugs 40 of the elastically deformable lugs 38 of the hollow base 13, whilst being held in the deflected position by the latter, until, escaping from the elastically deformable lugs 38, it can revert to its initial configuration due to its inherent elasticity.

However, having previously passed the retaining lug 30 of the hollow base 13, it escapes from the latter, and can again become interengaged with the retaining lug 30 upon subsequent replacement of the cover 23 on the hollow base 13.

Figure 6:
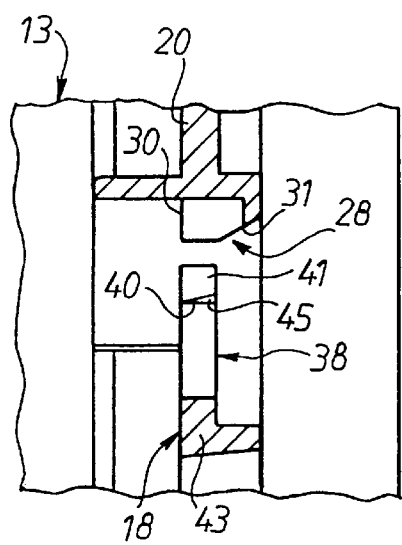
FIG. 6 is a fragmentary view of the hollow base in cross-section taken along the line VI—VI in FIG. 4 and to a still larger scale.

In the embodiment shown, and as seen more clearly in FIG. 6, the retaining lug 40 of the elastically deformable lugs 38 of the hollow base 13 incorporates a chamfer 45 which, to accommodate the profile of the elastically deformable lug 27 of the cover 23 when the latter is deflected, extends obliquely to the root of these elastically deformable lugs 38, widening from the outside edge of the elastically deformable lugs 38 to their inside edge.

In the embodiment shown, releasable clipping means 46 for correctly locating the cover 23 on the hollow base 13 are provided, at least locally, at the edge of the cover 23, in a manner that is known in itself.

As shown here, for example, these are hooks projecting from the upstanding rim 24, along the edge of the latter and adapted to cooperate with openings 47 provided in corresponding relationship to them on the hollow base 13.

However, unlike the elastically deformable lug 27, the releasable clip means 46 are accessible from the front, via lugs 48 in line with them in the periphery of the cover 23, provided for this purpose.

Of course, the present invention is not limited to the embodiment described and shown but encompasses any variant execution thereof.

Moreover, although more specifically intended for self-contained emergency lighting units, its field of application is not necessarily limited to such self-contained emergency lighting units, but could equally well extend to any electrical unit, for example alarm units which are to be attached to a mount and which include internally active units liable to be live.

There is claimed:

1. An electrical unit including a hollow base adapted to be plugged rearwardly into a mount connected to an electrical supply, the hollow base having a base wall, at least one cover for removably closing the hollow base from a front of the hollow base and selectively limiting access to said base wall, at least one housing inside said hollow base and disposed between the base wall and the at least one cover, said housing accommodating at least one active unit connectable to an electrical supply through the mount when the hollow base is plugged into the mount, means for retaining said cover on said hollow base so that said cover is removable from said hollow base only when said hollow base is out of plugged relationship with the mount and the hollow base is accessible from the rear.

2. The electrical unit claimed in claim 1, wherein the means for retaining the cover to the hollow base comprises a generally hook-shaped elastically deformable lug projecting from an inner surface of the cover, an opening for receiving said elastically deformable lug in said base wall, said lug being accessible only rearwardly of said cover, and at least one retaining lug releasably engageable with said elastically deformable lug.

3. The electrical unit as claimed in claim 2, wherein retaining lug flanks said opening in said base wall, said retaining lug having an oblique insertion chamfer at a front end thereof.

4. The electrical unit claimed in claim 2, wherein said base wall delimits a rearwardly opening cavity, said rearwardly opening cavity being complementary in shape with a portion of said mount when said hollow base is received in plugged relationship with the mount, said deformable lug being located in line with said rearwardly opening cavity.

5. The electrical unit as claimed in claim 2, wherein said cover covers the entire hollow base.

6. The electrical unit claimed in claim 2, wherein said hook shaped elastically deformable lug comprises a first deformable lug having a cover retaining position and a released position when deflected from said cover retaining position to permit release from the retaining lug, and a second said deformable lug reasonably engageable with said deformable lug along a path of movement from the retaining position to the released position to maintain said first deformable lug in said released position until removal of the cover.

7. The electrical unit claimed in claim 6, wherein said second deformable lug lies within said opening in said base wall.

8. The electrical unit as claimed in claim 6, wherein said second deformable lug includes a retaining lug having a chamfer at a fixed end thereof, said chamfer extending obliquely from the front end relative to a fixed end, said first deformable lug increasing in width from an outside edge thereof to an inside thereof.

9. The electrical unit claimed in claim 6, wherein said second deformable lug is disposed laterally relative to the first deformable lug and is cooperable with a lateral edge of said first deformable lug, said first deformable lug having a projecting retaining boss, said retaining boss being set back relative to said lateral edge.

10. The electrical unit as claimed in claim 9, wherein there are two said second deformable lugs facing each other and releasably engageable with respective lateral edges of said first deformable lug.

11. The electrical unit claimed in claim 2, wherein said cover having a middle area and a peripheral edge, said deformable lug being is disposed in the middle area of the cover and spaced from said peripheral edge.

12. The electrical unit as claimed in claim 11, wherein only a single said deformable lug is provided on said cover.

13. An electrical unit including a hollow base adapted to be plugged rearwardly into a mount connected to an electrical supply, the hollow base having a base wall, at least one cover for removably closing the hollow base from a front of the hollow base and selectively limiting access to said base wall, at least one housing inside said hollow base and disposed between the base wall and the at least one cover, said housing accommodating at least one active unit connectable to an electrical supply through the mount when the hollow base is plugged into the mount, said at least one cover having a first generally hook-shaped elastically deformable lug projecting from an inner surface thereof, said base wall having an opening for receiving said first elastically deformable lug, said first lug being accessible rearwardly of said cover, and at least one retaining lug releasably engageable with said first elastically deformable lug for retaining said cover on said hollow base, the first deformable lug having a cover retaining position and a released position when deflected from said cover retaining position to permit release from the retaining lug, a second deformable lug releasably engageable with said first deformable lug along a path of movement of said first deformable lug from the retaining position to the released position to maintain said first deformable lug in said released position until removal of the cover.

14. An assembly comprising an electrical unit and a mount therefor, said electrical unit including a hollow base, said mount being connected to an electrical power supply, the hollow base being plugable rearwardly into the mount, the hollow base having a base wall, at least one cover for removably closing the hollow base from a front of the hollow base and selectively limiting access to said base wall, at least one housing inside said hollow base and disposed between the base wall and the at least one cover, said housing accommodating at least one active unit connectable to an electrical supply through said mount when the hollow base is plugged into said mount, said at least one cover having a generally hook-shaped elastically deformable lug projecting from an inner surface thereof, said base wall having an opening for receiving said elastically deformable lug, said lug being accessible only rearwardly of said cover, and at least one retaining lug releasably engageable with said elastically deformable lug for retaining said cover on said hollow base, said cover being removable from said hollow base only when said hollow base is out of plugged relationship with said mount and said deformable lug is rearwardly accessed and released from said at least one retaining lug.

* * * * *